United States Patent
Li et al.

(10) Patent No.: US 9,126,359 B2
(45) Date of Patent: Sep. 8, 2015

(54) METHOD OF PRODUCING A DEVICE COMPRISING AT LEAST ONE DISPLACEABLE OPERATING MEMBER AS WELL AS SUCH A DEVICE

(75) Inventors: Nan Li, Singapore (SG); Bartele Hendrik De Vries, Drachten (NL); Gregorius Zwarts, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 178 days.

(21) Appl. No.: 13/517,187

(22) PCT Filed: Jan. 20, 2011

(86) PCT No.: PCT/IB2011/050255
§ 371 (c)(1),
(2), (4) Date: Jun. 19, 2012

(87) PCT Pub. No.: WO2011/089560
PCT Pub. Date: Jul. 28, 2011

(65) Prior Publication Data
US 2012/0258279 A1 Oct. 11, 2012

(30) Foreign Application Priority Data

Jan. 25, 2010 (EP) .................................... 10151570

(51) Int. Cl.
*B32B 3/24* (2006.01)
*H01H 13/02* (2006.01)
(Continued)

(52) U.S. Cl.
CPC ..... *B29C 45/14754* (2013.01); *B29C 45/14311* (2013.01); *B29L 2031/466* (2013.01);
(Continued)

(58) Field of Classification Search
CPC ................. H01H 2231/012; H01H 2221/044; H01H 2221/006; H01H 2229/044; H01H 2229/047; H01H 2223/003; H01H 2227/036; H01H 2221/076; H01H 2221/002; B29L 2031/466
See application file for complete search history.

(56) References Cited

U.S. PATENT DOCUMENTS 3,760,137 A * 9/1973 Shimojo et al. ............... 200/263
3,908,100 A * 9/1975 Richard et al. ................ 200/5 A
(Continued)

FOREIGN PATENT DOCUMENTS

DE 3006592 A * 8/1981 ........... H01H 13/702
EP 0736940 A1 10/1996
(Continued)

OTHER PUBLICATIONS
Machine Translation of JP 09092081 A, Apr. 1997.*
(Continued)

*Primary Examiner* — Jeff Vonch

(57) ABSTRACT

A method of producing a device comprises at least one displaceable operating member, wherein a foil (2) is placed into a mold and at least one polymer is injected into the mold to form a housing wall (3) adhering to the foil (2). The displaceable operating member comprises at least a flexible part of the foil (2) extending over a hole (5) in the housing wall (3). The foil is inserted into the mold, after which said polymer is injected into the mold to form the housing wall (3) with the hole and to form a support element (6) located in the hole (5). A gap (7) is provided between the support element (6) and the housing wall (3). The support element (6) is, at least at an outer area (9) near the gap (7), adhered to the foil (2) with a reduced adhesion force compared to an adhesion force between the housing wall (3) and the foil (2). After removing the device from the mold, the support element (6) and the flexible part of the foil (2) are mutually disconnected at a location of said reduced adhesion force.

16 Claims, 1 Drawing Sheet

(51) Int. Cl.
*H01H 13/52* (2006.01)
*B29C 45/14* (2006.01)
*B29C 45/16* (2006.01)
H01H 13/06 (2006.01)
H01H 13/702 (2006.01)
B29L 31/46 (2006.01)
H01H 13/88 (2006.01)

(52) U.S. Cl.
CPC .......... *H01H13/88* (2013.01); *H01H 2221/006* (2013.01); *H01H 2221/044* (2013.01); *H01H 2229/047* (2013.01)

(56) References Cited

U.S. PATENT DOCUMENTS

| | | | | |
|---|---|---|---|---|
| 3,978,297 | A * | 8/1976 | Lynn et al. | 200/5 A |
| 4,395,817 | A * | 8/1983 | Asada et al. | 29/622 |
| 4,439,647 | A * | 3/1984 | Calandrello et al. | 200/5 A |
| 4,681,987 | A * | 7/1987 | Suwa | 200/5 A |
| 4,766,271 | A * | 8/1988 | Mitsuhashi et al. | 200/512 |
| 4,847,452 | A * | 7/1989 | Inaba | 200/5 A |
| 5,491,314 | A * | 2/1996 | Dorsey | 200/313 |
| 5,679,304 | A | 10/1997 | Watanabe et al. | |
| 5,702,666 | A * | 12/1997 | Hatakeyama et al. | 264/544 |
| 5,779,230 | A * | 7/1998 | Nakao | 264/130 |
| 5,950,808 | A * | 9/1999 | Tanabe et al. | 200/314 |
| 5,952,630 | A * | 9/1999 | Filion et al. | 200/5 R |
| 5,986,228 | A * | 11/1999 | Okamoto et al. | 200/516 |
| 6,033,613 | A | 3/2000 | Heyn | |
| 6,737,596 | B1 * | 5/2004 | Hein | 200/310 |
| 6,752,946 | B2 | 6/2004 | Toyooka | |
| 7,586,735 | B2 * | 9/2009 | Chen et al. | 361/288 |
| 7,758,787 | B2 * | 7/2010 | Grems et al. | 264/250 |
| 2004/0108618 | A1 * | 6/2004 | Kwak | 264/132 |
| 2005/0051416 | A1 * | 3/2005 | Mahoney et al. | 200/512 |
| 2005/0276525 | A1 * | 12/2005 | Hebert et al. | 383/203 |
| 2006/0228057 | A1 * | 10/2006 | Newrones et al. | 383/103 |
| 2007/0069418 | A1 | 3/2007 | Liao et al. | |
| 2007/0262062 | A1 | 11/2007 | Guth | |
| 2009/0242374 | A1 * | 10/2009 | Ohsumi | 200/5 A |
| 2010/0282585 | A1 * | 11/2010 | Jonas et al. | 200/514 |
| 2012/0306787 | A1 * | 12/2012 | Ciesla et al. | 345/173 |

FOREIGN PATENT DOCUMENTS

| | | | | |
|---|---|---|---|---|
| FR | 2786604 A1 * | 6/2000 | | H01H 11/00 |
| JP | 4152986 A | 5/1992 | | |
| JP | 04305418 A * | 10/1992 | | |
| JP | 04366513 A * | 12/1992 | | |
| JP | 06218759 A | 9/1994 | | |
| JP | 06325656 A * | 11/1994 | | |
| JP | 6325656 A | 11/1994 | | |
| JP | 6328506 A | 11/1994 | | |
| JP | 06328506 A * | 11/1994 | | |
| JP | 07088887 A * | 4/1995 | | |
| JP | 07214592 A | 8/1995 | | |
| JP | 07239992 A * | 9/1995 | | |
| JP | 09092081 A * | 4/1997 | | H01H 13/70 |
| JP | 9167539 A | 6/1997 | | |
| JP | 09167539 A * | 6/1997 | | |
| JP | 2000100277 A | 4/2000 | | |
| JP | 2000280278 A * | 10/2000 | | B29C 45/14 |
| JP | 2000306457 A * | 11/2000 | | H01H 13/04 |
| JP | 2001307579 A * | 11/2001 | | H01H 11/00 |
| WO | WO 2004088694 A1 * | 10/2004 | | H01H 13/70 |

OTHER PUBLICATIONS

Machine Translation of FR 2786604 A1, Jun. 2000.*

* cited by examiner

METHOD OF PRODUCING A DEVICE COMPRISING AT LEAST ONE DISPLACEABLE OPERATING MEMBER AS WELL AS SUCH A DEVICE

FIELD OF THE INVENTION

The invention relates to a method of producing a device comprising at least one displaceable operating member, wherein a foil is placed into a mould and at least one polymer is injected into the mould to form a housing wall adhering to the foil, which displaceable operating member comprises at least a flexible part of the foil extending over a hole in the housing wall.

The invention relates to a device comprising at least one displaceable operating member, which device is provided with a foil and a housing wall adhering to the foil by injection moulding in a mould, wherein the displaceable operating member comprises at least a flexible part of the foil extending over a hole in the housing wall.

BACKGROUND OF THE INVENTION

Using such a method, which is known from U.S. Pat. No. 6,752,946 B2, such a device is made by means of insert injection moulding. First, the flexible foil is inserted into a mould. During the moulding process, a polymer is heated up, liquefied and injected into the mould against one side of the foil. After injecting the polymer and providing it with the desired shape, the polymer is cooled down and solidified to form the housing wall. When the polymer changes from a hot liquid into a cool solid housing wall, the total volume of the polymer will be reduced; the percentage of the reduction of the total volume of the polymer is presented as the shrinkage factor. The polymer will adhere to the foil during injection moulding. After the injection moulding process, at the area where the polymer is present, the foil will shrink together with the polymer. At the location of the hole, where no polymer is present, the flexible part of the foil extending over the hole is not heated as much as the polymer and will almost not shrink after the injection moulding process. As a result of the combination of the foil and a polymer housing wall which has been shrunk and the flexible part of the foil extending over the hole, which flexible part almost has not shrunk, the flexible part will be formed into a dome-shaped bump.

A disadvantage of the known device is that such a dome-shaped bump results in an uneven surface of the foil. Furthermore, additional measures need to be taken in order to be able to use the dome-shaped bump as a displaceable operating member and to ensure good pressing feeling.

SUMMARY OF THE INVENTION

It is an object of the invention to provide a method of producing a device with a displaceable operating member, which can easily be pressed, whilst the foil has an even surface due to almost uniform shrinkage of the foil.

This object is achieved by the method according to the invention in that the foil is inserted into the mould, after which said at least one polymer is injected into the mould to form the housing wall with the hole and to form a support element located in the hole, wherein a gap is provided between the support element and the housing wall, wherein the support element is, at least at an outer area near the gap, adhered to the foil with a reduced adhesion force compared to an adhesion force between the housing wall and the foil, wherein after removing the device from the mould, the support element and the flexible part of the foil are mutually disconnected at a location of said reduced adhesion force.

During injection moulding, the foil will be adhered to the housing wall as well as to the support element. Due to the shrinkage of the housing wall and the support element, the foil will shrink as well. Only at the location of the gap, the shrinkage of the foil will be less. However, since the gap can be relatively small, a relatively uniform shrinkage of the foil will be obtained, resulting in an optimal visual result.

By disconnecting the foil and the location of the reduced adhesion force, the foil and the outer area are separated. The flexible foil part is displaceable with respect to the housing wall.

During the injection moulding process, the support element is preferably adhered with a relatively large adhesion force to the flexible foil part near the central area of the support element, wherein the support element together with the flexible foil part will form the operating member. The flexible foil part will allow the support element to be moved with respect to the housing wall.

An embodiment of the method according to the invention is characterized in that the support element and the flexible part of the foil are mutually disconnected at a location of said reduced adhesion force by displacing the operating member with respect to the housing wall.

When the operating member is pressed, it will be displaced with respect to the housing wall due to the flexibility of the flexible part of the foil. The support element and the flexible part of the foil will be mutually disconnected at the location of said reduced adhesion force. Preferably, the adhesion force is removed the first time the operating member is displaced over a minimum distance, like for example 1 mm.

Another embodiment of the method according to the invention is characterized in that the support element and the flexible part of the foil are mutually disconnected at a location of said reduced adhesion force by heating the device.

After the housing wall and the support element have solidified, the device is heated again, for example to 60 degrees for about 24 hours, whereby the support element and the flexible part of the foil are mutually disconnected.

Another embodiment of the method according to the invention is characterized in that the support element is adhered to the flexible part of the foil near a central area of the support element, with an adhesion force similar to the adhesion force between the foil and the housing wall.

After removing the adhesion force between the flexible foil part and the outer area of the support member, the support member will remain attached to the flexible foil at the central area. The support element and the flexible part jointly form the displaceable operating member. When the operating member is pressed, the flexible foil part can be deformed between the walls of the hole and the central area of the support element and the support element will be moved with respect to the housing wall. By enlarging or reducing the outer area, the distance over which the support element can be moved can be made smaller or larger by an amount which allows easy pressing of the displaceable operating member.

Another embodiment of the method according to the invention is characterized in that the outer area of the support element is adhered to the flexible part of the foil by means of a semi-adhesive providing said reduced adhesion force.

Such a semi-adhesive provides adhesion between the flexible part and the outer area, due to which the foil will be forced to shrink with the polymer of the housing wall when the liquid polymer solidifies. After the moulding process, due to the reduced adhesion force, the connection between the outer area of the support element and the flexible part of the foil by means of the semi-adhesive can easily be broken to allow the flexible part of the foil to be displaced with respect to the housing wall.

Another embodiment of the method according to the invention is characterized in that the semi-adhesive comprises a cross-linked ink layer like Proell PUR-ZK, XWR, N2K.

Such a semi-adhesive provides a reduced adhesion force between the flexible part of the foil and the outer area of the support element, said adhesion force being large enough to force the foil to shrink together with the support element, and being small enough to allow the connection between the flexible part and the outer area to be removed after the moulding process. Using such a semi-adhesive, the foil can simultaneously be provided with the color of the ink.

Another embodiment of the method according to the invention is characterized in that the foil is provided with the semi-adhesive in at least part of the gap as well.

By doing so, it is ensured that the edge of the support element will always be located against a part of the foil provided with a semi-adhesive, also if the foil is not very accurately positioned in the mould.

It is another object of the invention to provide a device with a displaceable operating member, which can easily be pressed, whilst the foil has an even surface due to almost uniform shrinkage of the foil.

This object is achieved by the device according to the invention in that a support element is located in the hole, wherein a gap is located between the support element and the housing wall, and wherein the support element is adhered to the flexible part of the foil near a central area of the support element, whilst at an outer area of the support element near the gap the support element is not connected to the flexible part of the foil.

The support element together with the flexible part will form the displaceable operating member. When the operating member is pressed, the flexible foil part can be deformed between the wall of the hole and the central area of the support element and the support element will be moved with respect to the housing wall. Since the outer area is not connected to the flexible part of the foil, the outer area will not hinder the deformation of the foil. However, during injection moulding, the outer area was adhered to the foil with a reduced adhesion force compared to an adhesion force between the housing wall and the foil. Due to this reduced adhesion force, the flexible foil part opposite the outer area has shrunk together with the shrinkage of the support element. After removing the device from the mould, the support element and the flexible part of the foil are mutually disconnected at a location of said reduced adhesion force to enable the support member to move with respect to the housing wall.

Another embodiment of the device according to the invention is characterized in that the support element has a cylindrical shape and the outer area of the support element is ring-shaped and is concentrically located with respect to the hole.

In this manner, a round displaceable operating member will be obtained. However, it is also possible to realize holes and support elements having other shapes.

Another embodiment of the device according to the invention is characterized in that the support element and the housing wall are connected to each other by means of a bridge.

Such a bridge makes it possible to easily form the support element together with the housing wall by injection moulding, wherein the housing wall and the support element are formed from a single polymer. The liquid polymer will flow in the mould from a mould part forming the housing wall, through a mould part forming the bridge, to a mould part forming the support element.

Another embodiment of the device according to the invention is characterized in that a semi-adhesive is present on the outer area of the support element and/or on the flexible part of the foil at a location opposite to the outer area of the support element.

The semi-adhesive has been used as an adhesive during injection moulding. After mutually disconnecting the flexible foil part of the foil and the outer area of the support element, the residues of the semi-adhesive remain on the outer area and/or on the flexible part, but no longer function as an adhesive.

Another embodiment of the device according to the invention is characterized in that the housing wall and the central area of the support element are both adhered to the foil by means of an adhesive.

The adhesive is applied to the foil to ensure that the foil and the polymer are strongly adhered to each other during the injection moulding process. Such an adhesive provides a relatively large adhesion force between the foil and the housing wall and between the foil and the central area of the support element.

Another embodiment of the device according to the invention is characterized in that the device is a domestic appliance, preferably a hand-held domestic appliance, more preferably a shaver.

Such a device will have a seamless look, be visually smooth and watertight at the operating member.

BRIEF DESCRIPTION OF THE DRAWINGS

The invention will be explained in more detail with reference to the drawings, in which.

Like parts are indicated by the same reference numbers in the Figures.

DETAILED DESCRIPTION OF EMBODIMENTS

Figure 1A:
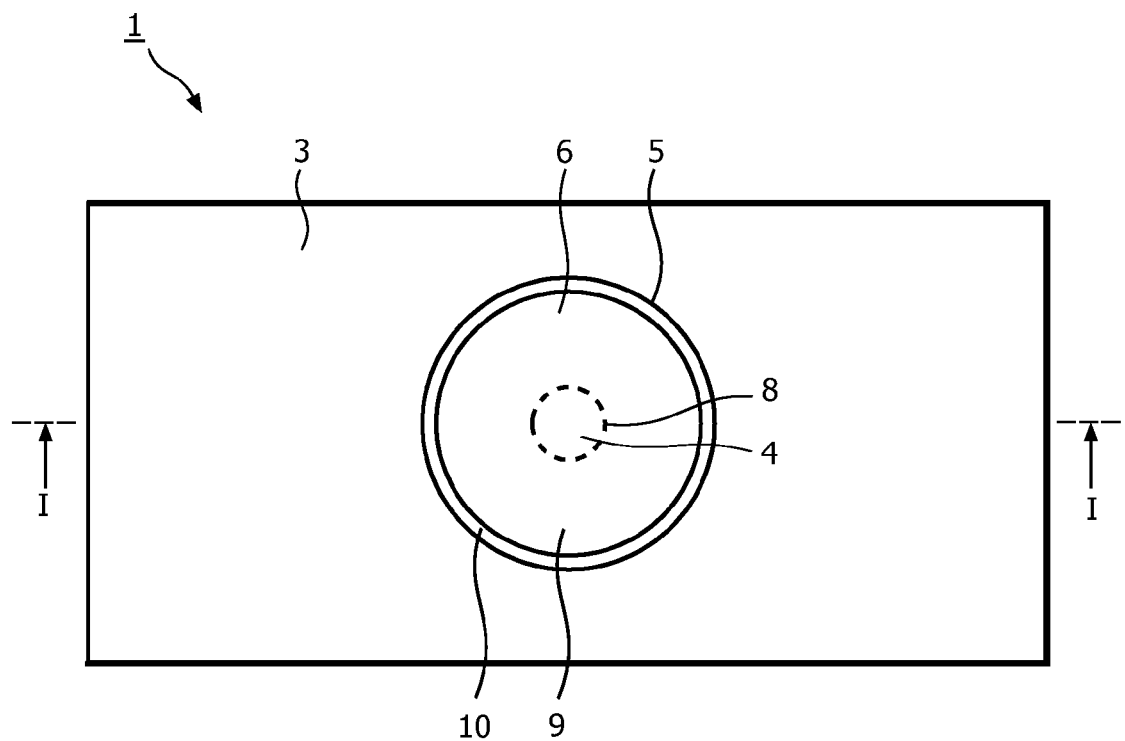
FIG. 1A is a bottom view of a device according to the invention.
Figure 1B:
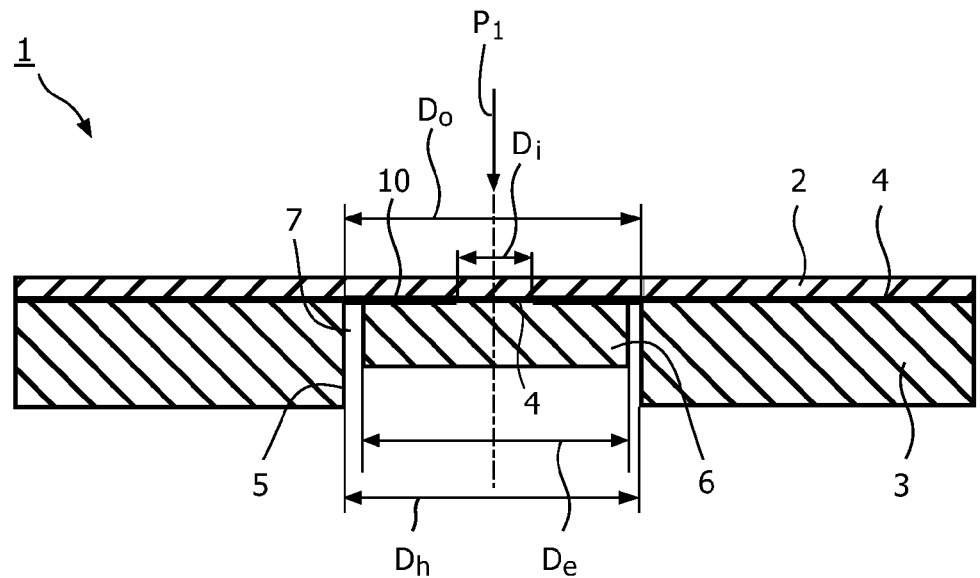
FIG. 1B is cross section of the device as shown in FIG. 1A.

FIGS. 1A and 1B show a device 1 according to the invention comprising a foil 2 and a polymer housing wall 3 permanently adhered to the foil 2 with a relatively large adhesion force by means of an adhesive 4. The housing wall 3 is provided with at least one through hole 5 with a diameter $D_h$. In the through hole 5 a cylindrical support element 6 with a diameter $D_e$ is located, wherein the diameter $D_h$>the diameter $D_e$. The support element 6 is made of the same polymer as the housing wall 3. The support element 6 has a thickness which is less than the thickness of the housing wall 2. The support element 6 is concentrically positioned with respect to the through hole 5. Between the support element 6 and the walls of the through hole 5 a gap 7 with a width of $0.5*(D_h-D_e)$ is present. The foil 2 extends over the through hole 5 and is adhered to the support element 6 by means of the adhesive 4. The adhesive 4 is provided in a central area 8 of the support element 6 having a diameter $D_i$. The foil 2 is adhered to the support element 6 at an outer area 9 outside the central area 8 by means of a semi-adhesive 10 providing a reduced adhesion force compared to the adhesion force between the foil 2 and the housing wall 3 and between the foil 2 and the central area 8 of the support element 6. The semi-adhesive 10 is also applied on the foil 2 in the gap 7 and extends to the walls of the through hole 5. The outer diameter $D_o$ of the circle of semi-adhesive 10 is about the same as the diameter $D_h$. The semi-adhesive comprises a cross-linked ink layer like Proell PUR-ZK, XWR, N2K forcing the foil 2 to shrink together with liquid polymer during injection moulding and during cooling down to create a flat surface of the foil 2.

After cooling down, the part of the flexible foil 2 extending over the through hole 5 together with the support element 6 can be used as a displaceable operating member. The properties of the semi-adhesive 10 are such that when the foil 2 and the support element 6 are pushed downwards in the direction as indicated by arrow P1, the support element 6 will be released from the foil 2 at the outer area 9. After a first movement of the support element 6 over a certain minimum distance of for example 1 mm, the support element 6 will only be adhered to the foil 2 in the central area 8 by means of the adhesive 4 with the relatively strong adhesion force, allowing the flexible part of the foil 2 enough movement while a pressing force is exerted on the displaceable operating member. The force needed to move the support element 6, and the distance over which the support element 6 can be moved, depends amongst others on the diameter $D_i$ of the central area 8.

The diameter $D_i$ is preferably 5-8 mm. The diameter $D_o$ is always larger than the diameter $D_i$ and is preferably 15-25 mm.

It is also possible to mutually disconnect the flexible part of the foil and the outer area of the support element by heating the device after it has been removed from the mould used during injection moulding.

The device 1 can be used to provide any kind of domestic appliance, like hand-held appliances such as shavers with a displaceable operating member.

The hole 5 and the support element 6 may have different shapes, like rectangular or elliptical.

It is also possible that the support element 6 is made of another polymer than the housing wall 3.

It is also possible that the support element 6 has a thickness which is the same as or larger than the thickness of the housing wall 2.

It is also possible to connect the housing wall and the support element by means of a bridge of for example 3 mm width, which simplifies the production of the device by means of injection moulding.

It is also possible to refrain from using the adhesive 4, and instead adhere the polymer housing wall 3 directly to the foil 2.

It has to be noticed that the diameter $D_o$ of the semi-adhesive 10 can also be smaller than the diameter $D_h$ of the through hole 5 and can even be the same as the diameter $D_e$ of the support element 6. It is also possible that the diameter $D_o$ of the semi-adhesive 10 is slightly larger than the diameter $D_h$ of the through hole 5. However, preferably $D_h > D_o > D_e > D_i$.

It is also possible that $D_i = 0$, in which case the element 6 can be fully disconnected from the foil 2 after the injection moulding and only serve to uniformly shrink the foil.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A device including a displaceable operating member, said device comprising:
    a housing wall having a hole defined therein;
    a foil adhered to the housing wall and having a flexible part extending flatly across said hole; and
    a support element movably disposed in the hole beneath the flexible part of the foil, said support element having a central area that is non-detachably adhered by a semi-adhesive material to a corresponding central area of the flexible part of the foil and having an outer area that is releasably adhered to a corresponding outer area of the flexible part of the foil surrounding the central area of said of said flexible part of the foil;
    said flexible part of the foil and said support element collectively forming said displaceable operating member.

2. The device according to claim 1 where the support element has a cylindrical shape and the outer area of the support element is ring-shaped and is concentrically located with respect to the holes.

3. The device according to claim 1 where the support element and the housing wall are connected to each other by means of a bridge.

4. The device according to claim 1 where the semi-adhesive material is disposed on the outer area of the support element.

5. The device according to claim 1 where the semi-adhesive material is disposed on the outer area of the flexible part of the foil.

6. The device according to claim 1 where the housing wall and the central area of the support element are both adhered to the foil by means of an adhesive.

7. The device according to claim 1 where said device comprises a domestic appliance.

8. The device according to claim 7 where said device comprises a hand-held domestic appliance.

9. The device according to claim 7 where said device comprises a shaver.

10. A method of producing the device according to claim 1, said method comprising:
    placing the foil into a mould;
    on a side of the foil that will face the inside of the hole, applying an adhesive to the central area of the foil and applying the semi-adhesive material to the outer area of the foil;
    injecting at least one polymer into the mould to form the housing wall with the hole and the support element disposed in the hole, said at least one polymer adhering to a part of the foil not covering the hole, a gap being provided between the support element and the housing wall to facilitate movement of the support element within the hole, said support element being adhered to the outer area of the foil with a reduced adhesion force compared with an adhesion force at the inner area of the foil; and
    disconnecting the support element from the foil at the area of reduced adhesion force.

11. The method according to claim 10 where the support element and the flexible part of the foil are mutually disconnected at the area of said reduced adhesion force by displacing the operating member with respect to the housing wall.

12. The method according to claim 10 where the support element and the flexible part of the foil are mutually disconnected at the location of said reduced adhesion force by heating at least said support element and flexible part of the foil.

13. The method according to claim 10 where the support element is adhered to the flexible part of the foil near a central area of the support element with an adhesion force similar to an adhesion force between the foil and the housing wall.

14. The method according to claim 10 where the semi-adhesive comprises a cross-linked ink layer.

15. The method according to claim 10 where the semi-adhesive is applied to at least part of the foil portion covering the gap between the support element and the housing wall.

16. The method according to claim 10 where the housing wall and the support element are formed from a single polymer.

* * * * *